Feb. 7, 1933.  H. L. MYERS  1,896,677
DISPLAY DEVICE
Filed April 8, 1931  3 Sheets-Sheet 1
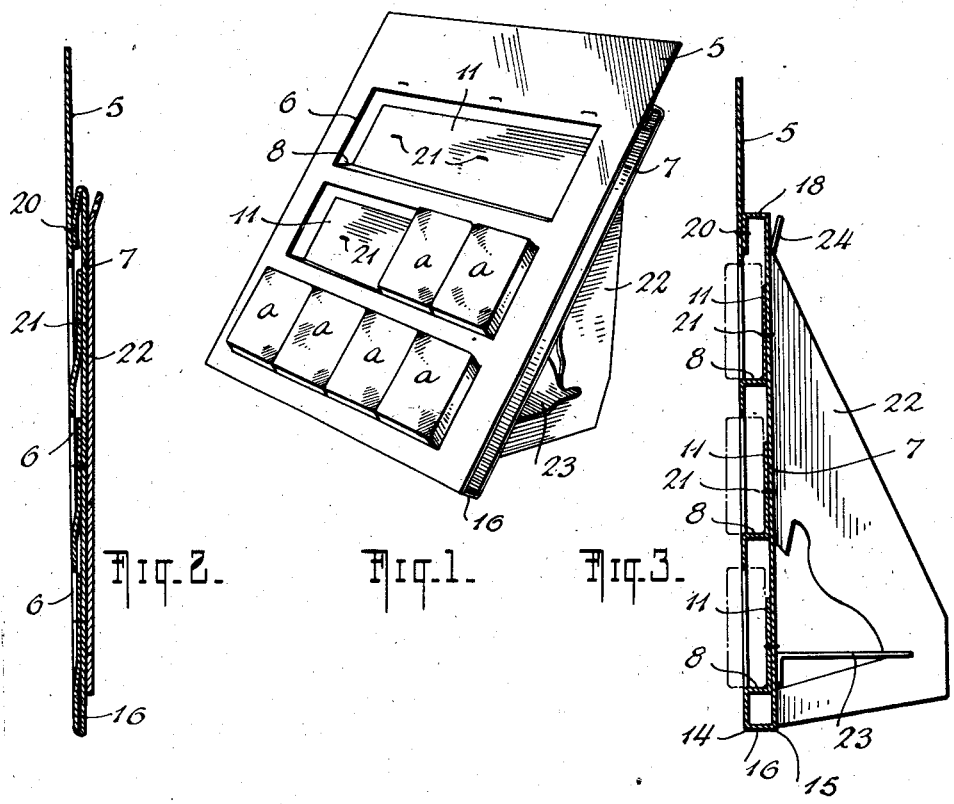
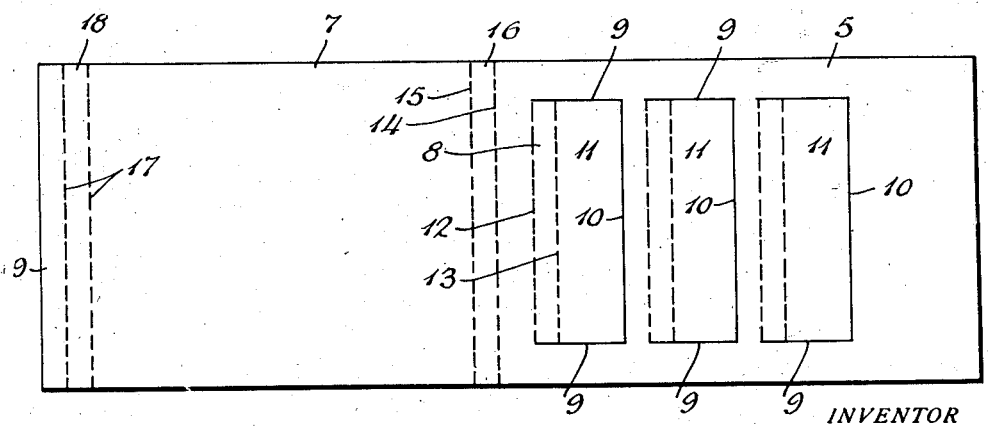
INVENTOR
HAROLD L. MYERS
BY
ATTORNEYS Feb. 7, 1933.                H. L. MYERS                 1,896,677
                             DISPLAY DEVICE
                          Filed April 8, 1931          3 Sheets-Sheet 2
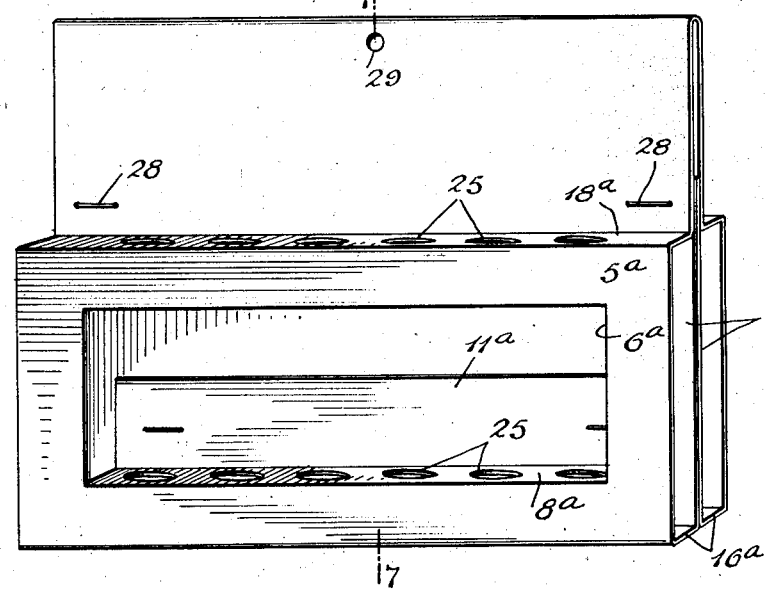
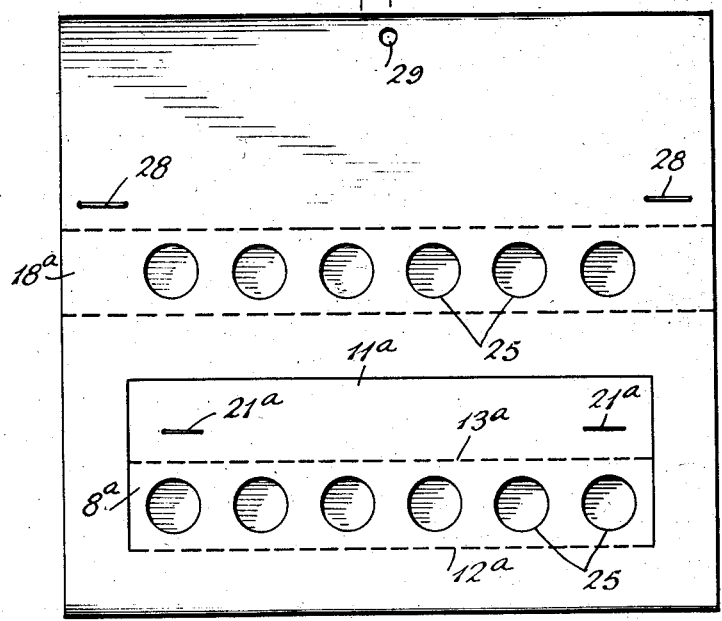
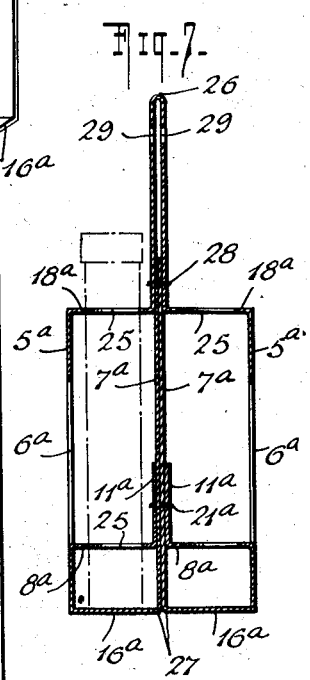
INVENTOR
HAROLD L. MYERS
BY
ATTORNEYS Feb. 7, 1933.  H. L. MYERS  1,896,677
DISPLAY DEVICE
Filed April 8, 1931   3 Sheets-Sheet 3
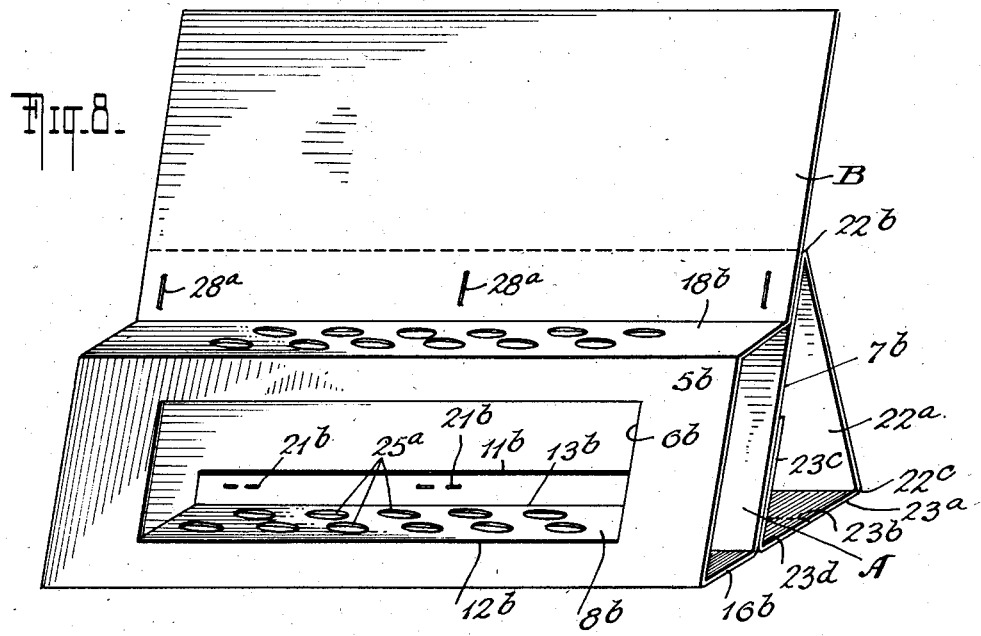
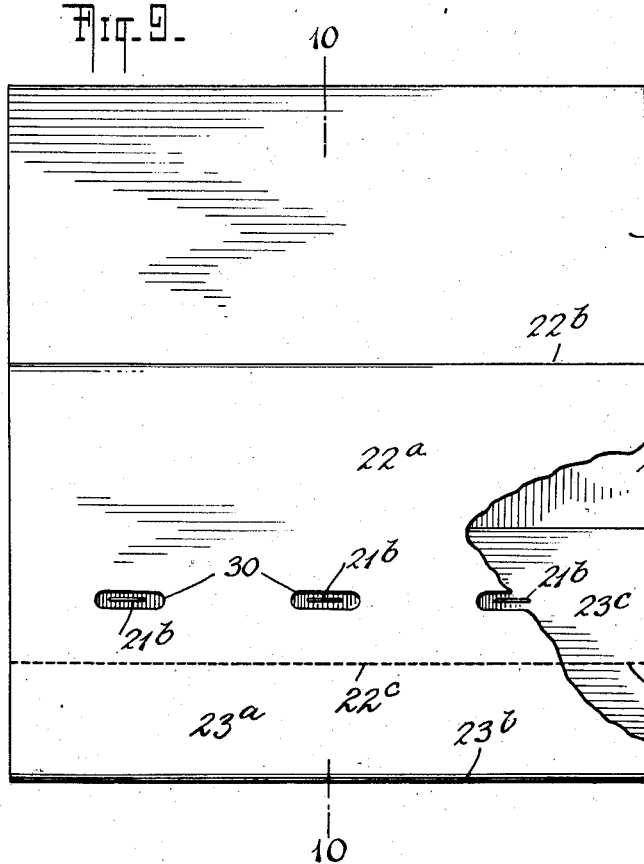
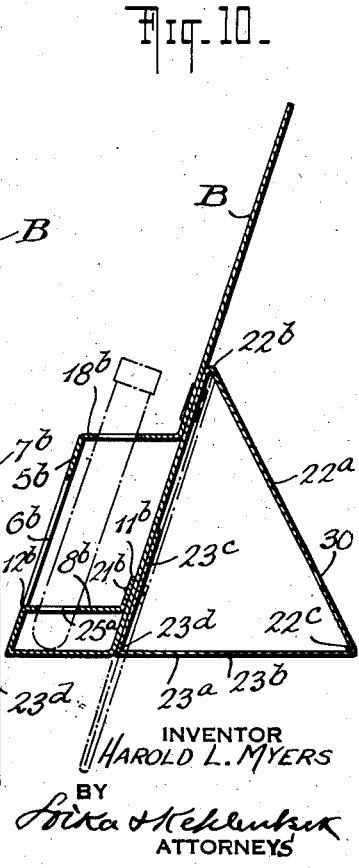
INVENTOR
HAROLD L. MYERS
BY
ATTORNEYS Patented Feb. 7, 1933

1,896,677

UNITED STATES PATENT OFFICE

HAROLD L. MYERS, OF MORRISTOWN, NEW JERSEY

DISPLAY DEVICE

Application filed April 8, 1931. Serial No. 528,540.

My invention relates to display devices and has for its object to provide a simple and efficient device designed to removably receive predetermined articles of merchandise and to display the same in an attractive manner so as to be readily accessible for removal and sale. Other more specific objects will appear from the description hereinafter, and the features of novelty will be pointed out in the claims.

In the accompanying drawings, which illustrate examples of the invention without defining its limits, Fig. 1 is a perspective view showing one form of the display device in use; Fig. 2 is a longitudinal section showing said display device in a folded condition; Fig. 3 is a corresponding sectional view of the device in its unfolded operative condition; Fig. 4 is a face view of the blank from which the form of the device shown in Figs. 1, 2 and 3 is constructed; Fig. 5 is a perspective view showing another form of the novel device in use; Fig. 6 is a face view thereof; Fig. 7 is a sectional view on the line 7—7 of Fig. 5; Fig. 8 is a perspective view of still another form of the invention as it appears in use; Fig. 9 is a rear view thereof in a folded condition; and Fig. 10 is a sectional view on the line 10—10 of Fig. 9 but showing the device as set up in Fig. 8.

In all of the forms the display device comprises a pair of panels, one of which is provided with at least one display opening, and may include a plurality of such openings, designed to receive and hold predetermined merchandise, and means movably connected with said panels whereby the latter are capable of being spaced apart to provide a back for each display opening included in the device, and to thereby form a display recess in registry with each display opening, the bottom and top of each recess being formed by the aforesaid movable means.

As shown in Figs. 1, 2, 3 and 4 of the drawings, the display device consists of a front panel 5 provided with a plurality of display openings 6 of predetermined dimensions and shape arranged in a vertical row, and a rear panel which is connected with the front panel 5 by hinge means 8 pivotally movable relatively to said panels to space the rear panel 7 from the front panel 5 in a manner to constitute a back for the display opening 6, the hinge means 8 at the same time being adjusted to positions in which the spaces between said panels are bridged at the bottoms of the opening 6, and thus constituting bottoms and tops for the display recesses formed in registry with each display opening 6. It will be understood that only one display opening 6 may be included in the front panel 5, and that the shape and dimensions of said opening or openings 6 may be varied to meet the requirements of the merchandise or its equivalent for which the particular display device is designed.

In the example illustrated in Figs. 1–4, the body of the device is constructed from a blank shown in Fig. 4 and of rectangular form in the desired predetermined dimensions. The blank is slit or cut along lines 9, which extend lengthwise of said blank in spaced parallel relation to each other and to the opposite longitudinal edges thereof, and which are connected by transverse cuts or slits 10 to form flaps 11 which normally lie within the openings 6 formed by the cuts or slits 9 and 10. Parallel scoring lines 12 and 13 extend transversely between the cuts or slits 9 to form bending lines for the flaps 11 whereby the hinge means 8 in the form of auxiliary flaps are provided for the purpose which will appear more fully hereinafter. Scoring lines 14 and 15 extend transversely across the blank at an intermediate point to divide said blank into the front panel 5 and the rear panel 7 to form a bottom flap 16. At the left-hand end in Fig. 4 the blank is provided with transverse scoring lines 17 to form an upper flap 18 and a tab 19 at the free end of that portion of the blank which constitutes the rear flap 7.

In assembling the display device of the example illustrated in Figs. 1–4, the rear panel 7 is folded on the scoring line 14 so as to extend rearwardly over the front panel 5, after which the tab 19 is folded on the one scoring line 17 into surface engagement with the front panel 5, so as to lie between the latter and the rear panel 7, as shown in Fig. 2; the tab 19 is secured in this position to the front panel 5 in any conventional manner, as by means of staples 20. The flaps 11 are then secured to the rear panel 7 in any convenient way, as for instance, by means of similar staples 21, so that at this stage the device presents the folded condition illustrated in Fig. 2. When it is intended to set the display device up for use, the rear panel 7 is moved away from the front panel 5, during which adjustment, the flaps 8, 16 and 18 describe pivotal movements on the respective scoring lines, so as to space the rear panel 7 from the front panel 5 in parallel relation thereto and in registry with the display openings 6; in this position the rear panel 7 constitutes a back for said display openings 6 and forms therewith a display recess and the intermediate flaps 8 form bottoms for said display openings, and for said display recesses, as clearly shown in Fig. 3; the intermediate flaps 8 and the upper flap 18 also may constitute tops for the aforesaid display recesses in some forms of the device, and may themselves in some forms include features adapting them to maintain certain articles of merchandise in the display recess or recesses in predetermined relation to the display opening or openings 6. The articles of merchandise such as packages $a$ for which the device is designed, may then be placed in the display device in the manner indicated in Fig. 1. Suitable means is provided for maintaining the device in a predetermined display position, which means as shown in Figs. 1 and 3 may comprise either a foldable prop 22 and a co-operating foldable securing means 23, whereby the device is supported in an inclined display position in the form of a stand, or said supporting means may comprise a suitable suspending tab 24 whereby the device may be suspended in a predetermined display position; as shown in the illustrated example both the prop 22 and its securing means 23, and the suspending tab 24 may be included whereby the display device may be selectively positioned in either a standing or suspended display position.

In the form shown in Figs. 5, 6 and 7 the display device comprises a unit consisting of two sections each of which is complete in itself and constitutes a display device; it will be obvious therefore that the display device may also be made in a form which includes only one of said sections.

As shown each section consists of a front or outer panel 5ª provided with a display opening 6ª of predetermined dimensions and shape, and a rear panel 7ª foldably connected with the front panel 6ª by means of an intermediate flap 8ª, a bottom flap 16ª and an upper flap 18ª; the two last named flaps 16ª and 18ª, in the illustrated example, comprise integral parts of the front panel 5ª and rear panel 7ª and are foldable relatively thereto on suitable score lines, and the intermediate flap 8ª, which is an integral part of the front panel 5ª, is attached by means of a flap 11ª to the rear panel 7ª and foldable relatively to said panels on score lines 12ª and 13ª. In the operative condition of the device, as illustrated in Fig. 5, the flap 8ª constitutes a bottom for the display recess located in registry with the opening 6ª and the upper flap 18ª constitutes a top for said display recess; the flaps 6ª and 18ª in the illustrated example are further provided with one or more apertures 25 located in vertical registry or other relative arrangement with respect to each other, in the operative condition of the device, for the accommodation of articles of merchandise to maintain the same in predetermined position in said display recess in registry with the display opening 6ª.

In the specific form illustrated the two sections of the display unit lie in opposed surface relation to each other and are constructed from a single blank. Each rear panel 7ª accordingly consists of two parts or extensions of said blank folded upon each other on a score line 26 and extensions folded upon each other on score lines 27 and projecting over and in surface engagement with the aforesaid two parts of said blank so as to lie between the same as shown in Fig. 7. The extensions are fixed in place and the two parts of the blank are secured in position by suitable fastening means such as staples 28 which pass through the aforesaid two parts of the blank and the extensions thereof as shown in Fig. 7. The flaps 11ª may be secured to the rear panels 7ª in any convenient manner as by means of staples 21ª which in such case may pass through the flaps 11ª of both sections and through the aforesaid two parts of the blank to maintain the two sections of the device in the intended opposed relation to each other as illustrated in Fig. 7.

The device, in the form now being described, when in its operative use, may stand in an upright display position upon the bottom flaps 16ª or it may be suspended by means of an eyelet 29 provided for this purpose in the aforesaid two parts of the blank as shown in Figs. 5 and 6. The articles of merchandise for which the display device is designed extend through the apertures 25 of the flaps 8ª and 18ª and in some cases may rest upon the bottom flap 16ª as shown in Fig. 7.

The display device in the form under discussion may be used for displaying any number of different articles of merchandise and if desired may be constructed and function in the same way as the form first described. The display device shown in Figs. 5, 6 and 7 may be folded to the position shown in Fig. 6 and may be used for shipping purposes with the articles for which it is designed in place thereon.

The form of the invention shown in Figs. 8, 9 and 10 illustrates a display device which, in the operative condition is supported, preferably in an inclined position, by means of a prop comprising an integral part of the structure.

The device in question consists of a front or outer panel 5ᵇ provided with a display opening 6ᵇ of predetermined dimensions and shape, and a rear panel 7ᵇ foldably connected with the front panel 5ᵇ by means of a bottom flap 16ᵇ and an upper flap 18ᵇ, which, in the illustrated example, comprise integral parts of the front panel 5ᵇ and rear panel 7ᵇ and are foldable relatively thereto on suitable score lines. The device further includes an intermediate flap 8ᵇ, which is an integral part of the front panel 5ᵇ and is attached by means of a flap 11ᵇ to the rear panel 7ᵇ said flap 8ᵇ being foldable relatively to said panels on score lines 12ᵇ and 13ᵇ as shown in Figs. 8 and 9. In the operative condition of the device, as illustrated in Figs. 8 and 10, the flap 8ᵇ constitutes a bottom for the display recess located in registry with the opening 6ᵇ and the upper flap 18ᵇ constitutes a top for said display recess; the flaps 6ᵇ and 18ᵇ as shown in the illustrated example may further be provided with one or more apertures 25ᵃ located in vertical registry or other relative arrangement with respect to each other. In the operative condition of the device, the apertures 25ᵃ serve to accommodate the articles of merchandise for which said device is designed and to maintain the same in predetermined position in said display recess in registry with the display opening 6ᵇ.

In the specific form illustrated in Figs. 8, 9 and 10 the rear panel 7ᵇ accordingly consists of two sections or extensions of the blank from which the device is constructed, the lower section A overlapping the upper section B at the bottom thereof as shown in Figs. 8 and 9, and being secured in surface engagement therewith in any suitable manner. In the illustrated example the two sections A and B of the blank are secured in connection with each other by suitable fastening means such as staples 28ᵃ which pass through the aforesaid two sections A and B of the blank as shown in Figs. 8 and 10. Similar staples 21ᵇ which in such case pass through the flap 11ᵇ and through the lower section A of the blank may be utilized to foldably fasten the intermediate flap 8ᵇ to the rear panel 7ᵇ as illustrated in Figs. 8 and 10; the staples 21ᵇ, in the illustrated example, also perform additional fastening functions as will be pointed out more fully hereinafter.

The prop whereby the device of Figs. 8, 9 and 10 is supported in an operative position, preferably inclined to the vertical as shown in Fig. 8, comprises a supporting panel or member 22ᵃ foldably connected with the rear panel 7ᵇ along a suitable score line 22ᵇ so as to be capable of being adjusted to the supporting position shown in Figs. 8 and 10. To maintain said supporting member 22ᵃ in its operative position and to combine it with the device as a foldable part thereof, said member 22ᵃ is connected at its lower edge along a suitable score line 22ᶜ with a bottom member or panel 23ᵃ which is foldable upon itself along a suitable score line 23ᵇ. A flap 23ᶜ is foldably connected along a score line 23ᵈ and is suitably connected with the rear panel 7ᵇ in any convenient manner; as shown in Figs. 8 and 10 the previously mentioned staples 21ᵇ pass through said flap 23ᶜ for fixing the same in surface engagement with the rear panel 7ᵇ. To enable the staples 21ᵇ to be easily applied in position to secure the parts together and to reduce this stapling operation to the simplest point, the supporting member 22ᵃ is provided with apertures 30 located in registry with the staples 21ᵇ and the points at which they are to be located. With this arrangement the staples 21ᵇ may be set in place with the device in the folded, flat condition shown in Fig. 9 without danger of unintentionally fastening the member 22ᵃ to the flap 23ᶜ and rear panel 7ᵇ. In other words the staples 21ᵇ are simply passed through the apertures 30 and clinched by means of any conventional mechanism.

The device, in the form now being described, when in its operative use, stands in the upright inclined display position upon the bottom flap 16ᵇ and the bottom member 23ᵃ and is maintained in this position by the supporting member 22ᵃ as shown in Figs. 8 and 10. The articles of merchandise for which the display device is designed extend through the apertures 25ᵃ of the flaps 8ᵇ and 18ᵇ and in some cases, as in Fig. 7, may rest upon the bottom flap 16ᵇ as shown in Fig. 10.

The display device in the form under discussion may also be used for displaying any number of different articles of merchandise and if desired may also be constructed and function in the same way as the form first described. The display device shown in Figs. 8, 9 and 10 similarly may be folded to the position shown in Fig. 9 and may as in the previous forms, be used for shipping purposes with the articles for which it is designed in place thereon.

In all of its forms the novel display device is capable of being constructed, at least so far as its major portions are concerned, from a single piece of material such as cardboard fashioned to constitute the predetermined blank.

From the above it will be clear that the novel display device is capable of being made in many different ways without departing from the inventive idea, and that in all of its forms it is extremely simple in construction and yet is of maximum efficiency as a display device, and further that the articles of merchandise for which it is designed are securely held in attractive display positions and yet are capable of being easily removed at will for purposes of sale or examination.

The display device may be used as a container in which a predetermined number of the articles of merchandise for which it is designed may be shipped, in which case the supporting means 22—24 of Figs. 1–4, or its equivalent, occupies the folded position shown in Fig. 2, while the supporting means of Figs. 8, 9 and 10 is folded to the position illustrated in Fig. 9. It will be obvious that the display openings 6, 6$^a$ or 6$^b$ and the device itself may be of different shapes and dimensions than as shown in the illustrations, and that said device may be efficiently utilized for displaying many different types of merchandise in an attractive and easily accessible manner. It will furthermore be obvious that the lower flap 16 and upper flap 18 with its tab 19 may be omitted in Figs. 1–4, in which case the front and rear panels 5 and 7 respectively, would constitute independent elements foldably united by the flaps 8 or their equivalent, instead of comprising integral parts of each other, as shown.

Various changes in the specific forms shown and described may be made within the scope of the claims without departing from the spirit of the invention.

I claim:

1. A display device comprising a front panel provided with a display opening of predetermined dimensions and shape, a lower flap comprising an integral part of said front panel and foldable relatively thereto along a scoring line, a rear panel comprising an integral part of said lower flap and foldable relatively thereto along a scoring line, said rear flap being folded back over said front panel, an upper flap comprising an integral part of one of said panels and foldable relatively thereto along a scoring line, said upper flap being connected with the other panel, an intermediate flap comprising an integral part of said front panel cut from said opening and foldable relatively thereto on a scoring line extending along one edge of said opening and foldably connected with said rear panel, said flaps being pivotally movable to space said rear panel from said front panel to form a display recess to the rear of said display opening and to position said intermediate flap transversely to said display opening at the bottom edge thereof and in parallel, spaced relation to said lower flap, and means for supporting said device in a display position.

2. A display device comprising two outer panels each provided with a display opening, upper and lower flaps foldably connected with said outer panels at opposite edges thereof, extensions foldably connected with said upper flaps and with each other and folded upon each other, additional extensions foldably connected with said bottom flaps and projecting between said first named extensions to form a rear panel, said flaps being arranged to space said outer panels from said rear panel to form display recesses upon opposite sides thereof in registry with said display openings, and said upper flaps constituting tops for said display recesses, intermediate flaps foldably connected with said outer panels along the lower edges of said display openings and with said rear panel to constitute bottoms for said display recesses, and fastening means whereby said extensions and said intermediate panels are secured together.

3. A display device comprising a front panel provided with a display opening, a rear panel, an intermediate flap foldably connected with said front panel along the one edge of said opening and foldably secured to said rear panel, an upper flap foldably connected with both of said panels, said flaps serving to space said panels apart to form a display recess in registry with said display opening and constituting respectively a top and a bottom for said recess, and being provided with apertures arranged to occupy a predetermined relation to each other in the operative condition of the device for the reception of articles of merchandise, a supporting member foldably connected with said rear panel and constituting a prop for supporting said device in an inclined display position, and a bottom member foldable upon itself and foldably connected with said rear panel and supporting member for maintaining the latter in supporting position.

4. A display device comprising a front panel provided with a display opening, a rear panel, upper and bottom flaps foldably connected with said front panel at opposite edges thereof, and foldably connected with said rear panel, said flaps being arranged to space said panels apart to form a display recess in registry with said display opening, an intermediate panel foldably connected with said front panel along one edge of said display opening to constitute a bottom for said display recess, a flap foldably connected with said intermediate panel, a supporting member foldably connected with said rear panel and constituting a prop for supporting said device in a display position, a bottom member foldable upon itself and foldably connected with said supporting member for maintaining the latter in its supporting position, a flap foldably connected with said bottom member, and staples passing through the rear panel and through the flaps of said intermediate panel and bottom member for securing said flaps to said rear panel, said supporting member being provided with apertures in registry with said staples to permit the latter to be placed in position independently of said supporting member.

5. A display device comprising a pair of panels, one of which is provided with at least one display opening, foldable means comprising integral parts of at least one of said panels for spacing said panels apart to form a display recess in registry with said display opening, a supporting member foldably connected with one of said panels for supporting said device in a display position, foldable means for maintaining said supporting member in supporting position, and fastening devices whereby said folding means are connected with said one panel, said supporting member being provided with apertures in registry with said fastening devices to permit the latter to be placed in position independently of said supporting member.

In testimony whereof I have hereunto set my hand.

HAROLD L. MYERS.